United States Patent
Rynderman

(10) Patent No.: US 7,433,519 B2
(45) Date of Patent: Oct. 7, 2008

(54) BITSTREAM FORMAT FOR COMPRESSED IMAGE DATA

(75) Inventor: Michel Rynderman, Brighton, MA (US)

(73) Assignee: Avid Technology, Inc., Tewksbury, MA (US)

( * ) Notice: Subject to any disclaimer, the term of this patent is extended or adjusted under 35 U.S.C. 154(b) by 1021 days.

(21) Appl. No.: 10/817,209

(22) Filed: Apr. 2, 2004

(65) Prior Publication Data

US 2004/0196911 A1 Oct. 7, 2004

Related U.S. Application Data

(60) Provisional application No. 60/460,547, filed on Apr. 4, 2003.

(51) Int. Cl.
H04N 1/46 (2006.01)
H04N 1/00 (2006.01)
G06K 9/48 (2006.01)
G06K 9/36 (2006.01)

(52) U.S. Cl. .............. 382/199; 358/1.16; 358/426.04; 358/505; 382/242

(58) Field of Classification Search ............ 358/426.08, 358/426.11, 435, 3.26, 3.27, 426.01; 348/384.1, 348/438.1; 375/E7.146, E7.147, E7.148, 375/E7.14, E7.153, E7.154, E7.211, E7.226, 375/E7.231, E7.232; 382/199, 203, 236, 382/242

See application file for complete search history.

(56) References Cited

U.S. PATENT DOCUMENTS 5,428,390 A * 6/1995 Cooper et al. ............ 348/240.2
6,198,543 B1 * 3/2001 Ryan .......................... 358/1.9
6,456,659 B1 * 9/2002 Zuccaro et al. ........ 375/240.16
2003/0115021 A1 * 6/2003 Mates ........................ 702/186

FOREIGN PATENT DOCUMENTS

WO WO2004091221 * 10/2004

* cited by examiner

Primary Examiner—Jerome Grant, II
(74) Attorney, Agent, or Firm—Peter J. Gordon; Fish & Richardson

(57) ABSTRACT

It is desirable to provide a bitstream format for compressed data that would allow multiple processors to access and decompress different parts of the data in parallel. Compressed images are usually defined in terms of macroblocks that have a width less than the image width and a height less than the image height. Thus, an image is divided several bands of multiple lines, and each band of multiple lines is divided into a macroblock. The set of macroblocks that define a band is called herein a macroblock rasterscan. The bit stream format includes, for each image, a picture header followed by image scan data. The image scan data includes data corresponding to a plurality of macroblock rasterscans. The data for each macroblock rasterscan includes data for a plurality of macroblocks for a band of lines in the image followed by padding. The padding ensures that data for each macroblock rasterscan terminates on a data boundary. The picture header references an image scan index that indicates a number of macroblock rasterscans in the image scan data and a number of lines per macroblock rasterscan, followed by entries of the index. Each entry in the index includes an offset of the macroblock rasterscan in image scan. The picture header may contain a reference to a picture header type, that references an I_frame_image_descriptor, which references the image scan index.

22 Claims, 6 Drawing Sheets

| picture_header(){ | No. of bits |
|---|---|
| size_of_picture_header | 32 |
| size_of_picture_data | 32 |
| size_of_picture_trailer | 16 |
| picture_header_type | 8 |
| ... | |
| if (picture_header_type == 'I frame image ID'){ | |
| I_frame_image_descriptor() | |
| } | |
| } | |

FIG. 4

BITSTREAM FORMAT FOR COMPRESSED IMAGE DATA

CROSS REFERENCE TO RELATED APPLICATION

This application claims the benefit of prior filed provisional application No. 60/460,547, filed Apr. 4, 2003, and is incorporated herein by reference.

BACKGROUND

Compressed image data generally is stored in a format that permits efficient access to each part of the compressed image data and the parameters for decompressing each part of the compressed image data. There are several standards that have been defined for bitstream formats for different kinds of compressed data. For example, there is a bitstream format defined by the MPEG-2 standard. Typically, such a bitstream format includes picture header information and picture information. The header information typically includes information about how to access the compressed image data and associated parameters for each block of an image. Such bitstream formats generally are designed to enable efficient access to the bitstream as a single serial stream of data. MPEG-2 defines "slices" of compressed data by placing "slice markers" in the data stream; however a slice can only be accessed by scanning the data stream for the slice markers.

SUMMARY

It is desireable to provide a bitstream format for compressed data that would allow multiple processors to access and decompress different parts of the data in parallel without spending time scanning through all of the compressed image data. Compressed images are usually defined by macroblocks that have a width less than the image width and a height less than the image height. Thus, an image is divided several bands of multiple lines, and each band of multiple lines is divided into a macroblock. The set of macroblocks that define a band is called herein a macroblock rasterscan.

The bit stream format includes, for each image, a picture header followed by image scan data. The bitstream also may include a picture footer or trailer. The image scan data includes data corresponding to a plurality of macroblock rasterscans. The data for each macroblock rasterscan includes data for a plurality of macroblocks for a band of lines in the image followed by padding. The padding ensures that data for each macroblock rasterscan terminates on a data boundary. This data boundary depends on the amount of data that permits efficient access by a processor, for example, but not limited to 4096 (4K) bytes.

The picture header references an image scan index that indicates a number of macroblock rasterscans in the image scan data and a number of lines per macroblock rasterscan, followed by entries of the index. Each entry in the index includes an offset of the macroblock rasterscan in image scan. The picture header may include a reference to a picture header type, that references an I_frame_image_descriptor, which references the image scan index.

Using the image scan index, each macroblock rasterscan can be randomly and directly accessed, thus allowing different macroblock rasterscans to be processed in parallel by different processors. Thus, multiple processors operating in parallel can efficiently decode an image.

Accordingly, in one aspect, a computer information product includes a computer readable medium and data stored on the computer readable medium that, when interpreted by a computer, defines a bitstream for compressed image data. The bitstream comprises, for each image, a picture header followed by image scan data. The image scan data includes data corresponding to a plurality of macroblock rasterscans. The data for each macroblock rasterscan includes data for a plurality of macroblocks for a band of lines in the image followed by padding, whereby data for each macroblock rasterscan terminates on a data boundary. The picture header references an image scan index that indicates a number of macroblock rasterscans in the image scan data and a number of lines per macroblock rasterscan, followed by entries of the index. Each entry in the index includes an offset of the macroblock rasterscan in image scan.

In another aspect, a method and computer program product for reading such a bitstream involves accessing the picture header to locate the image scan index. The image scan index is accessed to locate, for each macroblock rasterscan, the offset of the macroblock rasterscan in the image scan data. Each macroblock rasterscan then is retrieved according to the offsets from the image scan index. Each of the macroblock rasterscans may be decoded in parallel.

In another aspect, a method and computer program product for writing such a bitstream involves, for each image, defining a picture header followed by image scan data. For each band of lines in the image, a bitstream is defined in memory for a macroblock rasterscan using data for a plurality of macroblocks for the band of lines followed by padding that makes each macroblock rasterscan terminate on a data boundary. The image scan data is defined to include data corresponding to a plurality of macroblock rasterscans. An image scan index is defined that indicates a number of macroblock rasterscans in the image scan data and a number of lines per macroblock rasterscan, followed by entries of the image scan index. Entries in the image scan index are created such that each entry in the index includes an offset of the macroblock rasterscan in image scan. A reference in the picture header to the image scan index also is created. The picture header followed by the image scan data are written as the bitstream.

BRIEF DESCRIPTION OF THE DRAWINGS

FIG. 4 is a table describing an example data structure for picture header information.

DETAILED DESCRIPTION

Figure 1:
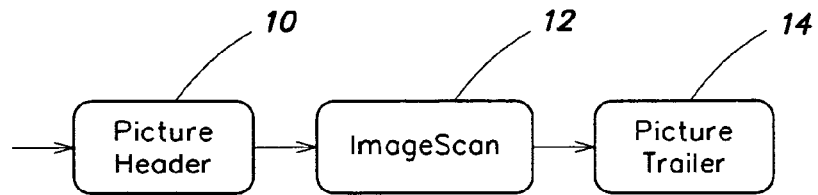
FIG. 1 is a diagram of an example data structure for compressed image data.

Referring now to FIG. 1, an example data structure for compressed image data will now be described. This data structure includes a picture header 10 and image scan data 12. A picture trailer 14 also may be used. The picture header stores information about the image scan data, and an example data structure for it is described in more detail below in connection with FIGS. 4-6. The image scan data 12 is a data structure that stores the encoded image data for an image. An example data structure for the image scan data is described in more detail below in connection with FIGS. 2-3. The picture trailer data terminates the data structure for an image.

Figure 2:
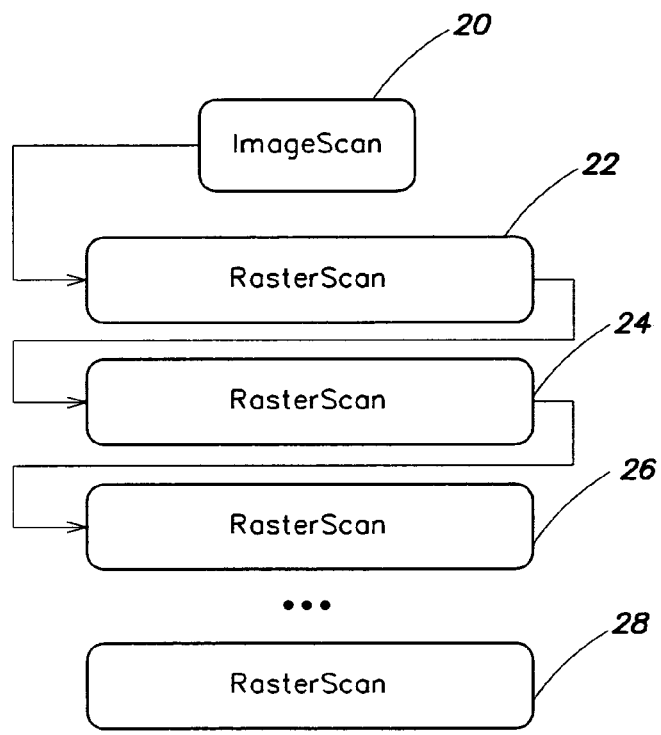
FIG. 2 is a diagram of an example data structure of image scan data in FIG. 1.

Referring now to FIG. 2 an example data structure for image scan data will now be described. The image scan data is defined by an image scan header 20, which references rasterscan data, as shown by 22, 24, 26 and 28. An image is divided several bands of multiple lines, and each band of multiple lines is divided into a macroblock. The set of macroblocks that define a band is called herein a macroblock rasterscan. The raster scan data, e.g., 22 is a data structure that stores the encoded image data for a macroblock rasterscan. An example data structure for the raster scan data is described in more detail below in connection with FIG. 3.

Figure 3:
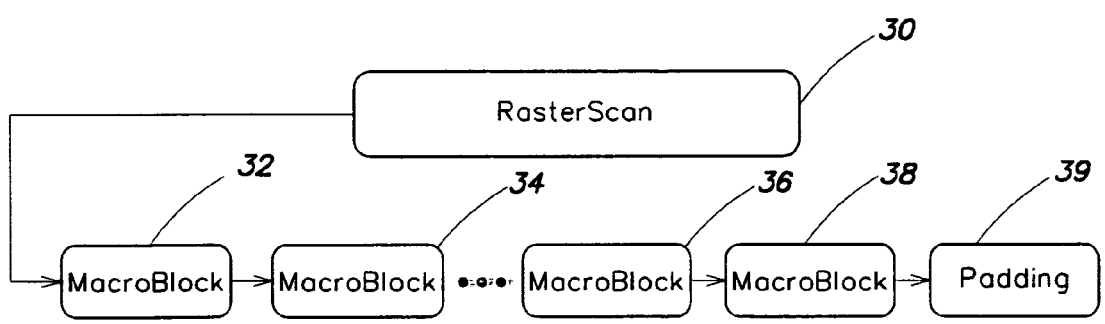
FIG. 3 is a diagram of an example data structure of raster scan data in FIG. 2.

Referring now to FIG. 3, an example data structure for raster scan data will now be described. The raster scan data is defined by an raster scan header 30, which references encoded data for macroblocks, as shown by 32, 34, 36 and 38, for a band of lines in the image. The encoded data for the macroblocks is followed by padding 39. The padding ensures that data for each macroblock rasterscan terminates on a data boundary. This data boundary depends on the amount of data that permits efficient access by a processor, for example, but not limited to 4096 (4K) bytes. The encoded data for a macroblock have a data structure that is similar to a macroblock data structure found in the MPEG-2 standard.

Referring now to FIG. 4, an example data structure for picture header information will now be described. The picture header references data that allows access to an image scan index that is an index of the locations of each macroblock rasterscan in the image scan data, and of the locations of the macroblock data in each macroblock rasterscan. An example data structure for the image scan index is described below in connection with FIG. 6. For example, the picture header data structure 40 may include general information 42 about the picture, which may be similar to information provided by a picture header data structure as defined by the MPEG-2 standard. The picture header 40 also may include a reference to a picture header type 44. If the type in this field corresponds to a predetermined value (called "I frame image ID" in FIG. 4), then the following value 46 is a reference to (called an "I_frame_image_descriptor" in FIG. 4) an image descriptor which describes the image and references the image scan index. An example data structure for the I_frame_image_descriptor is shown in FIG. 5.

Figure 5:
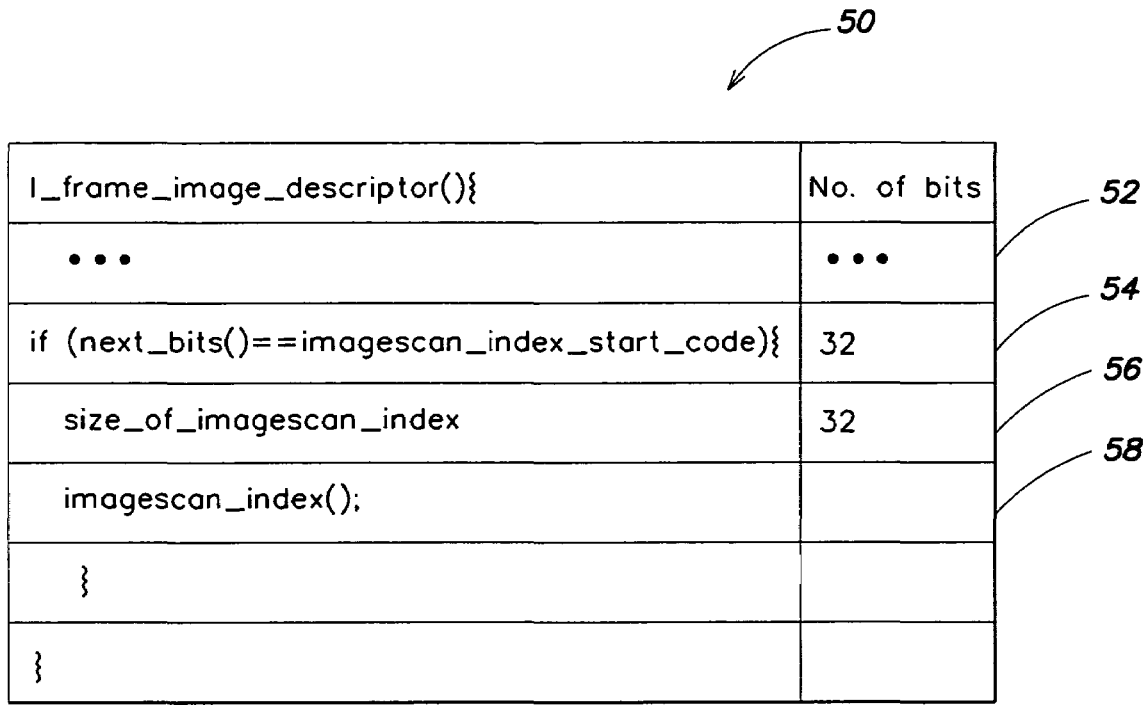
FIG. 5 is a table describing an example data structure for an image descriptor in FIG. 4.

Referring now to FIG. 5, an example data structure for an image descriptor will now be described. An image descriptor 50 is referenced by the picture header and references the image scan index. It includes general information about the image as indicated at 52. This general information is similar to data structures in the MPEG-2 standard for describing I-frames. The image descriptor may include a start code 54 for an image scan index (called "imagescan_index_start code" in FIG. 5) that, if present, is followed by a value 56 indicative of the size of the image scan index and a reference 58 to the data structure for the image scan index. An example data structure for the image scan index is shown in FIG. 6.

Figure 6:
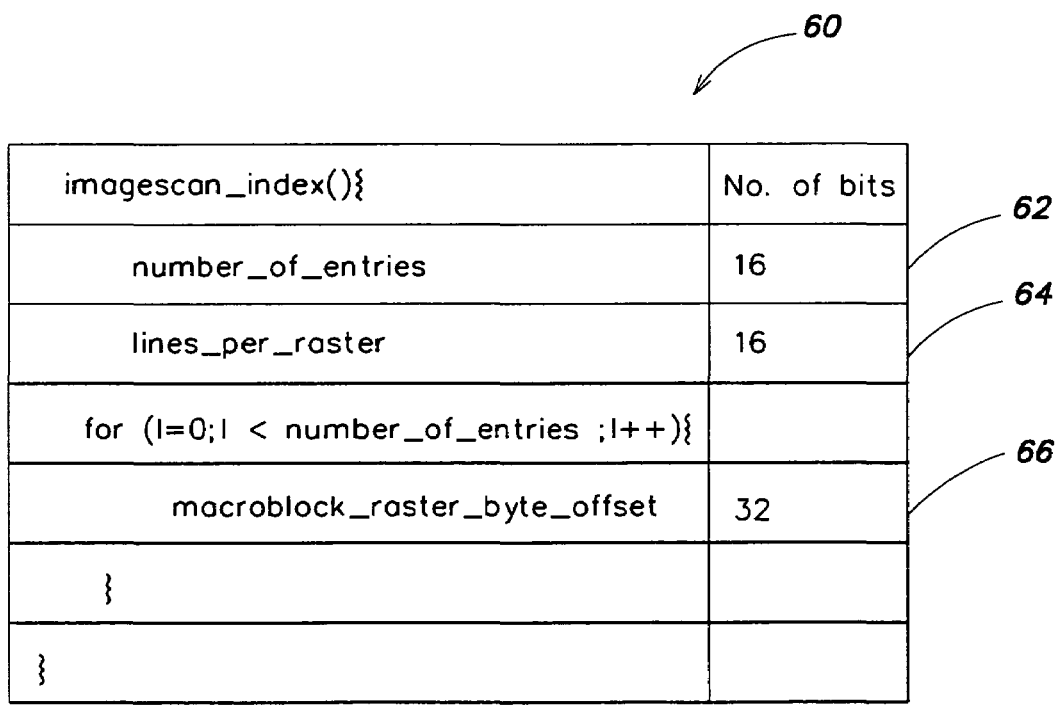
FIG. 6 is a table describing an example data structure for an image scan index in FIG. 5.

Referring now to FIG. 6, an example data structure for an image scan index will now be described. The image scan index 60 includes a value 62 indicating a number of entries in the index, which corresponds to the number of macroblock rasterscans in the image scan data. A value 64 indicates a number of lines per macroblock rasterscan. This data is followed by entries 66 of the index, the number of which corresponds to the number indicated by value 62. Each entry in the index indicates an offset of the macroblock rasterscan in image scan.

Using the image scan index, each macroblock rasterscan can be randomly and directly accessed, thus allowing different macroblock rasterscans to be processed in parallel by different processors. Thus, multiple processors operating in parallel can efficiently decode an image.

Figure 7:
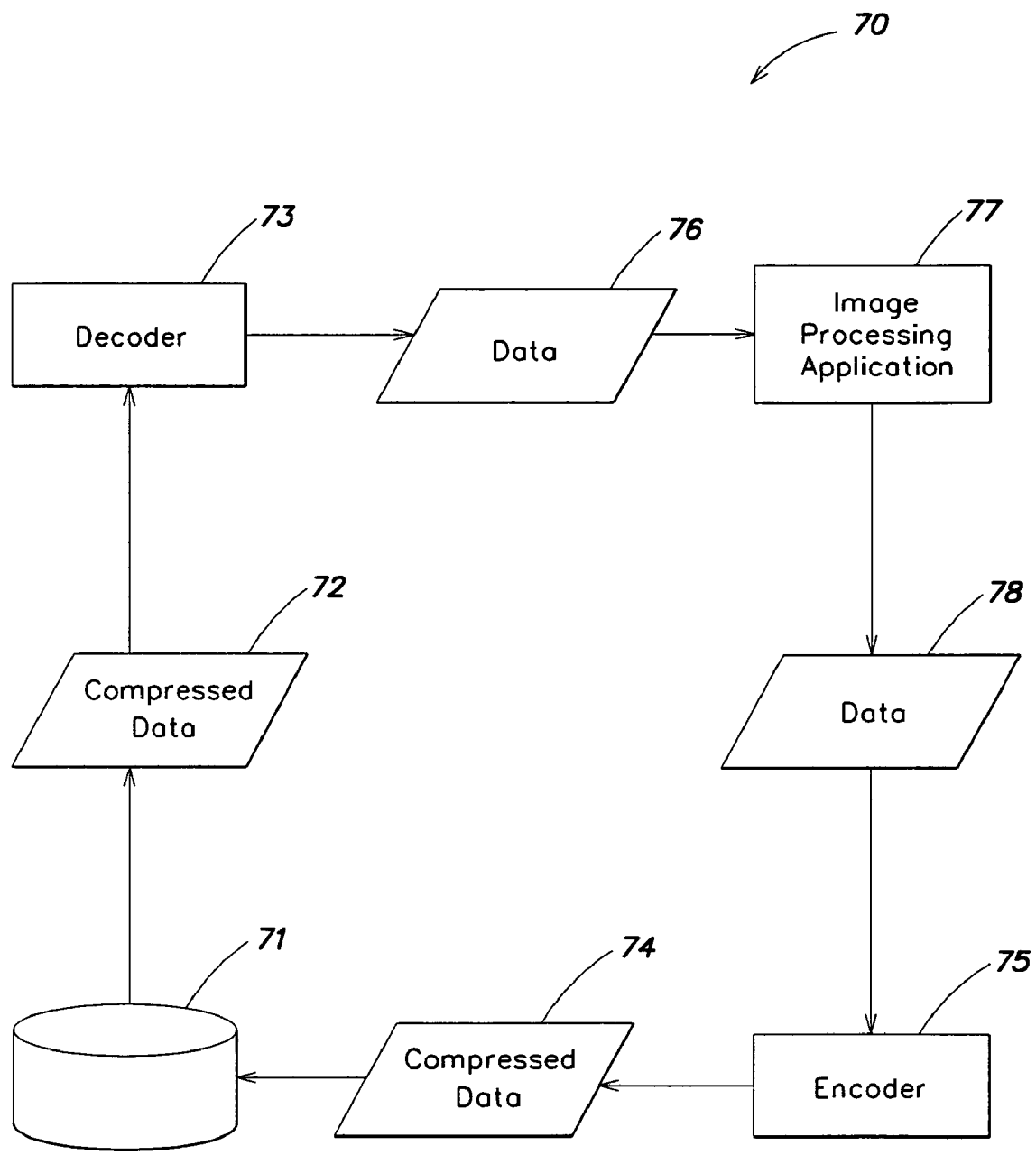
FIG. 7 is a dataflow diagram of an example image processing system using a bitstream format.

FIG. 7 is data flow diagram of an example image processing system that uses this bitstream format. The image processing system 70 includes data storage 71 that stores the bitstream, for example, in a data file or which may be referenced by metadata in a file format such as MXF or AAF. Such a bitstream also may be stored in memory, such as a cache. This bitstream format also may be used as a format for transmission of data, in which case 71 represents a transmission medium over which the compressed image data is transmitted as computer readable signals. Data 72 including the bitstream is read and decompressed by decoder 73. Data including the bitstream, shown at 74, is written into such a format by an encoder 75. The decoder 73 may read one or more macroblock rasterscans from the bitstream. The decoder 73 decompresses the read data and provides the decompressed data 76 to an image processing application 77.

The image processing application 77 performs operations on the image data to produce uncompressed image data 78. For example, such image processing operations may include, but are not limited to, operations for combining images, such as compositing, blending, and keying, or operations within an image, such as resizing, filtering, and color correction, or operations between two images, such as motion estimation. The image processing application also may be an application that captures and/or creates digital image data, without using any input image data. The image processing application also may manipulate metadata about the image data, for example to define a sequence of scenes of motion video information. The image processing application also may playback image data in one or more formats, without providing any output data.

Although FIG. 7 shows only one image processing application, there may be multiple image processing operations that may operate in parallel on the data or may operate as a sequence of operations. There are a variety of ways in which an image processing operation may process image data, and the invention is not limited thereby. As an example, the decoder and/or the image processing application and/or the encoder may be part of a larger application for editing video information and may access the image data in the same buffer in memory. As another example, the decoder and/or image processing application and/or the encoder may "plug-in" to an editing application that permits access to image data in memory through an application programming interface (API). The encoder and decoder may be implemented in hardware that is accessed by the image processing application.

Figure 8:
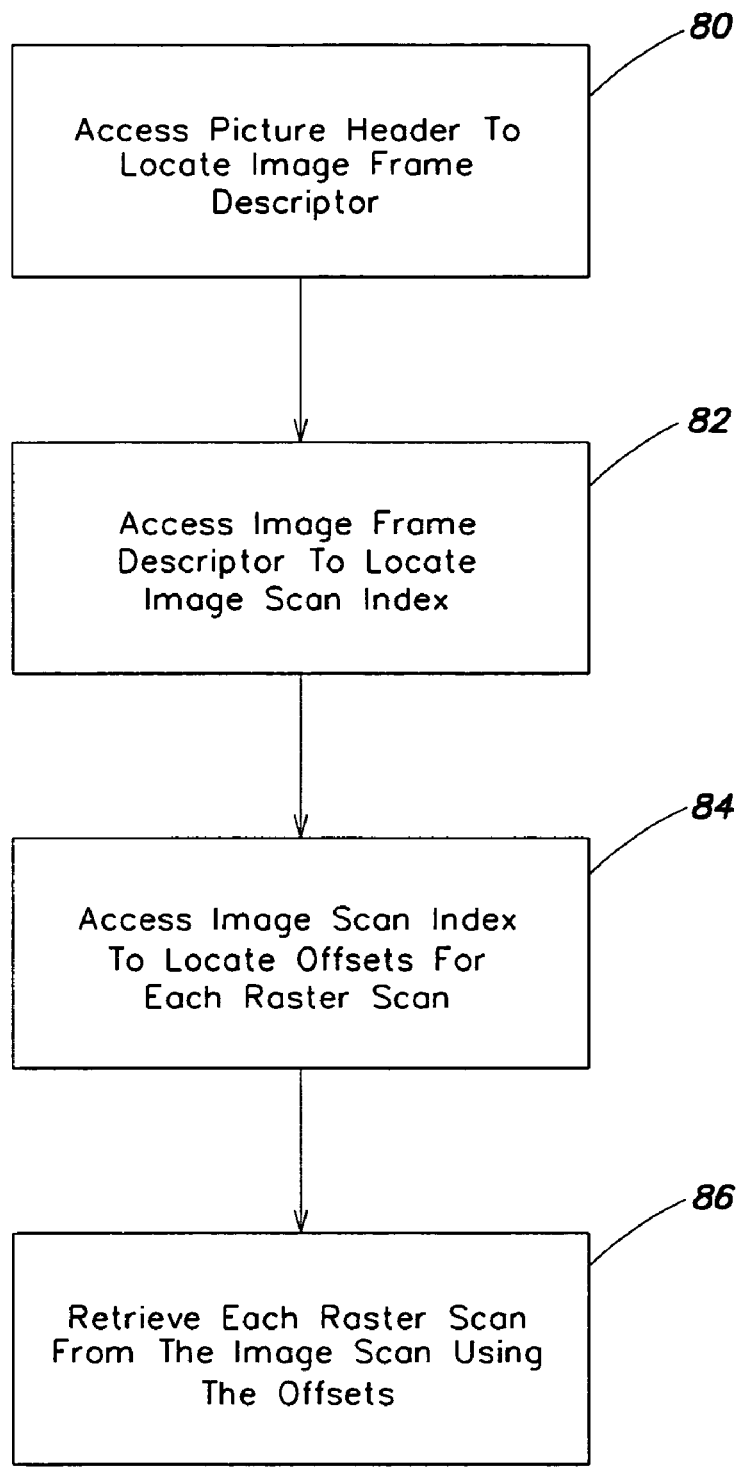
FIG. 8 is a flowchart describing how a bitstream may be read.

Referring now to FIG. 8, an example process for reading such a bitstream for an image, using the example data structures of FIGS. 1-6, will now be described. The picture header (FIG. 4) is accessed (80) to locate the i_frame_image_descriptor. The i_frame_image_descriptor (FIG. 5) is accessed (82) to locate the image scan index. The image scan index (FIG. 6) is then accessed (84) to locate, for each macroblock rasterscan, the offset of the macroblock rasterscan (e.g., 24) in the image scan data (12 in FIG. 1). Using the retrieved offsets, each of the macroblock rasterscans may be retrieved (86) from the image scan data and decoded. Because each macroblock rasterscan can be randomly and directly accessed, different macroblock rasterscans can be processed in parallel by different processors.

In one embodiment, if each macroblock rasterscan has an end of block code, indicating the end of the data for the macroblock rasterscan, and if the amount of padding is known, the process of FIG. 8 can be modified to read the data without the index. In this process, the macroblock rasterscan data may be scanned for the end of block code. If the padding is such that it ends on a determinable data boundary (such as a boundary divisible by 4096 bytes), then the end of the macroblock rasterscan is known. Reading can skip directly to the end of the macroblock rasterscan.

Figure 9:
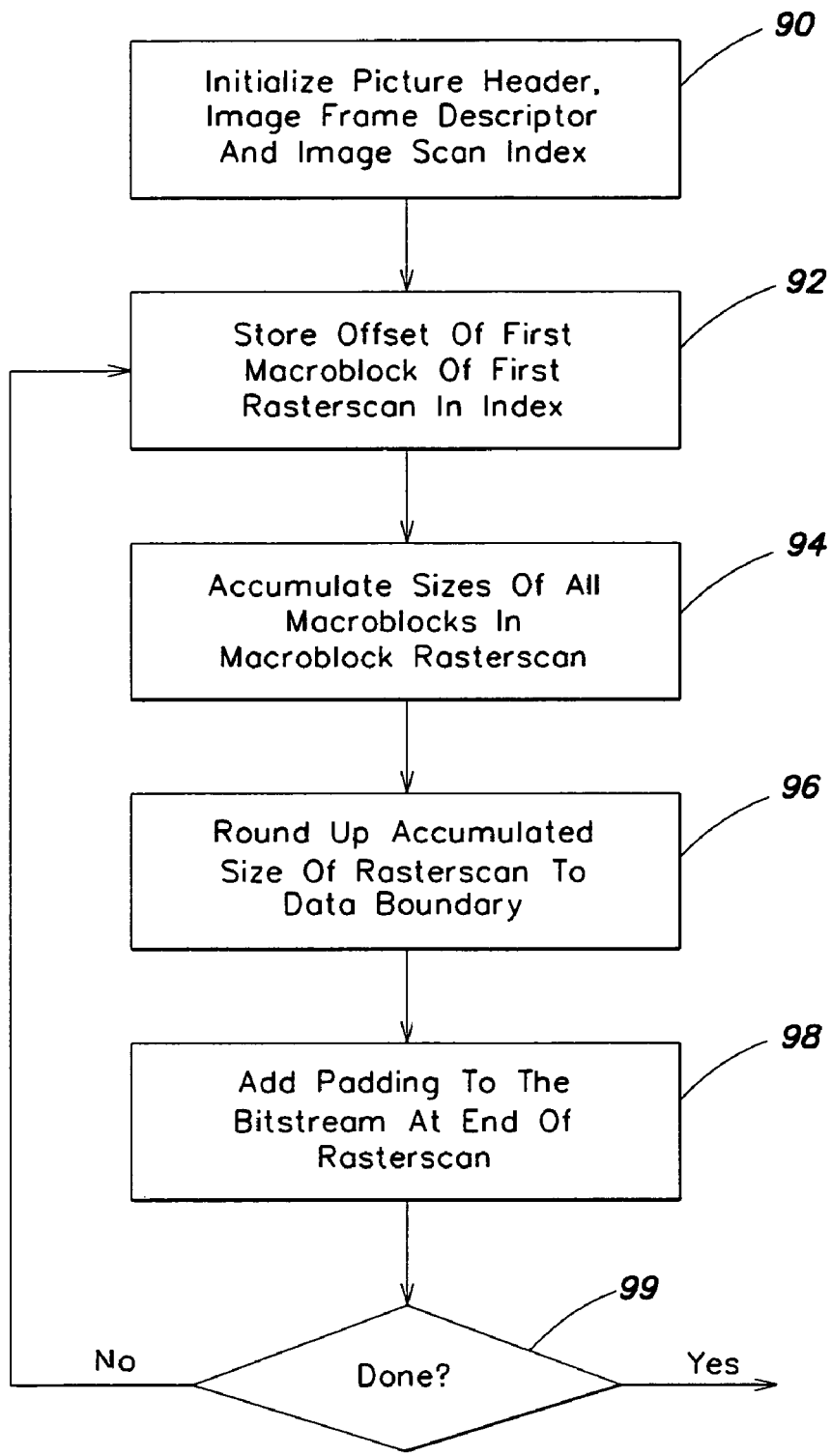
FIG. 9 is a flowchart describing how a bitstream may be written.

Referring now to FIG. 9, an example process for writing such a bitstream for an image, using the example data structures of FIGS. 1-6, will now be described. In this example, it is assumed that data is compressed an decoded in order by macroblock rasterscan. That is, each macroblock is encoded in order as they occur along a macroblock rasterscan, and the macroblock rasterscans are encoded in order as they occur in the image. The writing process involves, for each image scan, initializing (90) the data structures for the picture header, image frame descriptor and the image scan index. The number of entries, the number of lines per macroblock rasterscan and the size of the image scan index can be known and set in these data structures before compression of the image begins. As each macroblock is compressed and written into the image scan bitstream, the offset of the first macroblock of the first macroblock rasterscan is stored (92) as an entry in the image scan index. The sizes of the macroblocks are accumulated (94) for all macroblocks in the macroblock rasterscan. After all macroblocks in the macroblock rasterscan have been written, the accumulated size is rounded (96) up to the nearest data boundary (for example, a multiple of 4096 or 4K). The difference between the accumulated size and the rounded size is an amount of padding added (98) to the end of the data for the macroblock rasterscan that is written into the bitstream of the image scan. Steps 92 through 98 are repeated, as indicated at 99, for each macroblock rasterscan in the image. Data for each macroblock rasterscan also may be encoded in parallel.

The various components of the system shown in FIG. 7, and the flowcharts of FIGS. 8-9, may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, such as "C++," Visual Basic, JAVA or other language, such as a scripting language or even assembly language. The computer system may also be specially programmed, special purpose hardware. In a general-purpose computer system, the processor is typically a commercially available processor, such as various processors available from Intel, AMD, Cyrix, Motorola, and IBM. The general-purpose computer also typically has an operating system, which controls the execution of other computer programs and provides scheduling, debugging, input/output control, accounting, compilation, storage assignment, data management and memory management, and communication control and related services. Example operating systems include, but are not limited to, the UNIX operating system and those available from Microsoft and Apple Computer.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described above may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 7 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer information product, comprising:
a computer readable medium;
data stored on the computer readable medium that, when interpreted by a computer, defines a bitstream for compressed image data, comprising:
for each image, a picture header followed by image scan data,
wherein the image scan data includes rasterscan data corresponding to a plurality of macroblock rasterscans, wherein the rasterscan data for each macroblock rasterscan includes:
macroblock data for a plurality of macroblocks for a band of lines in the image; and
padding, wherein the macroblock data is followed by the padding,
whereby rasterscan data for each macroblock rasterscan terminates on a data boundary; and
wherein the picture header references an image scan index that indicates a number of macroblock rasterscans in the image scan data and a number of lines per macroblock rasterscan, followed by entries of the index, and wherein each entry in the index includes an offset of the macroblock rasterscan in image scan.

2. The computer information product of claim 1, wherein the picture header references the image scan index by referencing an image descriptor, and wherein the image descriptor includes a reference to the image scan index.

3. A method for reading a bitstream of compressed image data, wherein the bitstream includes:
   for each image, a picture header followed by image scan data,
      wherein the image scan data includes rasterscan data corresponding to a plurality of macroblock rasterscans, wherein the rasterscan data for each macroblock rasterscan includes:
         macroblock data for a plurality of macroblocks for a band of lines a the image; and
         padding, wherein the macroblock data is followed by the padding,
      whereby rasterscan data for each macroblock rasterscan terminates on a data boundary; and
      wherein the picture header references an image scan index that indicates a number of macroblock rasterscans in the image scan data and a number of lines per macroblock rasterscans, followed by entries of the index, and
      wherein each entry in the index includes an offset of the macroblock rasterscan in-image scan, the method comprising:
   accessing the picture header to locate the image scan index;
   accessing the image scan index to locate, for each macroblock rasterscan, the offset of the macroblock rasterscan in the image scan data; and
   retrieving each macroblock rasterscans according to the offsets from the image scan index.

4. The method of claim 3, further comprising decoding each of the macroblock rasterscans in parallel.

5. The method of claim 3, wherein the picture header references the image scan index by referencing an image descriptor, wherein the image descriptor includes a reference to the image scan index, wherein the accessing the picture header comprises:
   accessing the picture header to locate the image descriptor;
   accessing the image descriptor to locate the image scan index.

6. A computer program product comprising:
   a computer readable medium;
   computer program instructions stored on the computer readable medium that, when executed by a computer, instruct the computer to perform a method for reading a bitstream of compressed image data, wherein the bitstream includes:
   for each image a picture header followed by image scan data,
      wherein the image scan data includes rasterscan data corresponding to a plurality of macroblock rasterscans, wherein the rasterscan data for each macroblock rasterscan includes
         macroblock data for a plurality of macroblocks for a band of lines in the image; and
         padding, wherein the macroblock data is followed by padding,
      whereby rasterscan data for each macroblock rasterscan terminates on a data boundary; and
      wherein the picture header references an image scan index that indicates a number of macroblock rasterscans in the image scan data and a number of lines per macroblock rasterscan followed by entries of the index, and
      wherein each entry in the index includes an offset of the macroblock rasterscan in image scan, wherein the method comprises:
   accessing the picture header to locate the image scan index;
   accessing the image scan index to locate, for each macroblock rasterscan, the offset of the macroblock rasterscan in the image scan data;
   retrieving each macroblock rasterscans according to the offsets from the image scan index.

7. The computer program product of claim 6, wherein the method further comprises decoding each of the macroblock rasterscans in parallel.

8. The computer program product of claim 6, wherein the picture header references the image scan index by referencing an image descriptor wherein the image descriptor includes a reference to the image scan index, wherein the accessing the picture header comprises:
   accessing the picture header to locate the image descriptor;
   accessing the image descriptor to locate the image scan index.

9. A method for writing a bitstream of compressed image data, comprising:
   for each image, defining a picture header followed by image scan data, including:
      for each band of lines in the image, defining a bitstream in memory for a macroblock rasterscan using macroblock data for a plurality of macroblocks for the band of lines, followed by padding that makes each macroblock rasterscan terminate on a data boundary;
      defining the image scan data to include rasterscan data corresponding to a plurality of macroblock rasterscans and defining an image scan index that indicates a number of macroblock rasterscans in the image scan data and a number of lines per macroblock rasterscan, followed by entries of the image scan index;
      creating entries in the image scan index such that each entry in the index includes an offset of the macroblock rasterscan in image scan;
      creating a reference in the picture header to the image scan index, and
      writing the picture header followed by the image scan data in the bitstream.

10. A computer program product, comprising:
   a computer readable medium;
   computer program instructions stored on the computer readable medium that, when executed by a computer, instruct the computer to perform a method for writing a bitstream of compressed image data, comprising:
   for each image, defining a picture header followed by image scan data, including:
      for each band of lines in the image, defining a bitstream in memory for a macroblock rasterscan using macroblock data for a plurality of macroblocks for the band of lines, followed by padding that makes each macroblock rasterscan terminate on a data boundary;
      defining the image scan data to include data corresponding to a plurality of macroblock rasterscans; and
      defining an image scan index that indicates a number of macroblock rasterscans in the image scan data and a number of lines per macroblock rasterscan, followed by entries of the image scan index;
      creating entries in the image scan index such that each entry in the index includes an offset of the macroblock rasterscan in image scan;

creating a reference in the picture header to the image scan index, and writing the picture header followed by the image scan data in the bitstream.

11. A method for reading a bitstream of compressed image data, wherein the bitstream includes, for each image, a picture header followed by image scan data, wherein the image scan data includes rasterscan data corresponding to a plurality of macroblock rasterscans, wherein the rasterscan data for each macroblock rasterscan includes macroblock data for a plurality of macroblocks for a band of lines in the image; and padding, wherein the macroblock data is followed by padding, whereby data for each macroblock rasterscan terminates on a data boundary, the method comprising:

reading a macroblock rasterscan from the image scan data;

identifying an end of block code in the macroblock rasterscan; and reading a subsequent macroblock rasterscan starting from a data boundary immediately following the end of block code.

12. A computer information product, comprising:

a computer readable medium;

data stored on the computer readable medium that, when interpreted by a computer, defines a bitstream for compressed image data, comprising:

for each image, a picture header followed by image data, wherein the image data includes macroblock data for a plurality of sets of macroblocks, wherein each set of macroblocks includes a plurality of macroblocks, wherein the macroblock data for each set of macroblocks includes data for the plurality of macroblocks in the set, followed by padding whereby the data for each set of macroblocks terminates on a data boundary; and wherein the picture header references an index that indicates a number of sets of macroblocks in the image data and the image data represented by each set of macroblocks, followed by entries of the index, and wherein each entry in the index includes an offset for one of the sets of macroblocks in the image data.

13. The computer information product of claim 12, wherein the picture header references the index by referencing an image descriptor; and wherein the image descriptor includes a reference to the index.

14. A method for reading a bitstream of compressed image data, wherein the bitstream includes, for each image, a picture header followed by image scan data, wherein the image scan data includes rasterscan data corresponding to a plurality of macroblock rasterscan, wherein the rasterscan data for each macroblock rasterscan includes macroblock data for a plurality of macroblocks for a band of lines in the image; and padding, wherein the macroblock data is followed by padding, whereby data for each macroblock rasterscan terminates on a data boundary, the method comprising:

accessing the picture header to locate the image scan index;

accessing the image scan index to locate, for each macroblock rasterscan, the offset of the macroblock rasterscan in the image scan data;

retrieving each macroblock rasterscan according to the offsets from the image scan index.

15. The method of claim 14, further comprising decoding each of the sets of macroblocks in parallel.

16. The method of claim 14, wherein the picture header references the index by referencing an image descriptor, wherein the image descriptor includes a reference to the index, wherein the accessing the picture header comprises:

accessing the picture header to locate the image descriptor;

accessing the image descriptor to locate the index.

17. A computer program product, comprising:

a computer readable medium;

computer program instructions stored on the computer readable medium that, when executed by a computer, instruct the computer to perform a method for reading a bitstream of compressed image data, wherein the bitstream includes for each image, a picture header followed by image scan data, wherein the image scan data includes rasterscan data corresponding to a plurality of macroblock rasterscans, wherein the rasterscan data for each macroblock rasterscan includes macroblock data for a plurality of macroblocks for a band of lines in the image; and padding, wherein the macroblock data is followed by padding, whereby data for each macroblock rasterscan terminates on a data boundary, wherein the method comprises:

accessing the picture header to locate the index;

accessing the index to locate, for each set of macroblocks, the offset of the set of macroblocks in the image data;

retrieving each set of macroblocks according to the offsets from the index.

18. The computer program product of claim 17, wherein the method further comprises decoding each of the sets of macroblocks in parallel.

19. The computer program product of claim 17, wherein the picture header references the index by referencing an image descriptor, wherein the image descriptor includes a reference to the index, wherein the accessing the picture header comprises:

accessing the picture header to locate the image descriptor;

accessing the image descriptor to locate the index.

20. A method for writing a bitstream of compressed image data, comprising:

for each image, defining a picture header followed by image data, including:

defining a bitstream in memory for each set of a plurality of sets of macroblocks, wherein each bitstream includes macroblock data for a plurality of macroblocks, followed by padding that makes each set of macroblocks terminate on a data boundary;

defining the image data to include macroblock data corresponding to the plurality of sets of macroblocks; and defining an index that indicates a number of sets of macroblocks in the image data and the image data represented by each set of macroblocks, followed by entries of the index;

creating entries in the index such that each entry in the index includes an offset for one of the sets of macroblocks in the image data;

creating a reference in the picture header to the index, and writing the picture header followed by the image data in the bitstream.

21. A computer program product, comprising:
a computer readable medium;
computer program instructions stored on the computer readable medium that, when executed by a computer, instruct the computer to perform a method for writing a bitstream of compressed image data, comprising:
for each image, defining a picture header followed by image data, including:
- defining a bitstream in memory for each set of a plurality of sets of macroblocks, wherein each bitstream includes macroblock data for a plurality of macroblocks followed by padding that makes each set of macroblocks terminate on a data boundary;
- defining the image data to include macroblock data corresponding to the plurality of sets of macroblocks; and
- defining an index that indicates a number of sets of macroblocks in the image data and the image data represented by each set of macroblocks, followed by entries of the index;
- creating entries in the index such that each entry in the index includes an offset for one of the sets of macroblocks in the image data;
- creating a reference in the picture header to the index, and
- writing the picture header followed by the image data in the bitstream.

22. A method for reading a bitstream of compressed image data, wherein the bitstream includes, for each image, a picture header followed by image data, wherein the image data includes macroblock data for a plurality of sets of macroblocks, wherein each set of macroblocks includes a plurality of macroblocks, wherein the macroblock data for each set of macroblocks includes data for the plurality of macroblocks in the set, followed by padding whereby the data for each set of macroblocks terminates on a data boundary, the method comprising:
- reading a set of macroblocks from the image data;
- identifying an end of block code in the set of macroblocks; and
- reading a subsequent set of macroblocks starting from a data boundary immediately following the end of block code.

* * * * *